E. NALL & W. C. TYLER.
SKIVING MACHINE.
APPLICATION FILED APR. 11, 1914.

1,116,101.

Patented Nov. 3, 1914.
5 SHEETS—SHEET 1.

Fig 1.

Witnesses
Jas. L. Butler.
A. L. McClintock

Inventors
EDWARD NALL,
AND
WILLIAM C. TYLER.

By C. E. Humphrey
Attorney

E. NALL & W. C. TYLER.
SKIVING MACHINE.
APPLICATION FILED APR. 11, 1914.

1,116,101.

Patented Nov. 3, 1914.
5 SHEETS—SHEET 2.

Fig. 2.

Witnesses
Jas L Butler
P. L. McClintock

Inventors
EDWARD NALL.
AND
WILLIAM G. TYLER.
By C. E. Humphrey
Attorney

E. NALL & W. C. TYLER.
SKIVING MACHINE.
APPLICATION FILED APR. 11, 1914.

1,116,101.

Patented Nov. 3, 1914.
5 SHEETS—SHEET 3.

Witnesses

Inventors
EDWARD NALL.
AND
WILLIAM G. TYLER.

By

Attorney

E. NALL & W. C. TYLER.
SKIVING MACHINE.
APPLICATION FILED APR. 11, 1914.

1,116,101.

Patented Nov. 3, 1914.
5 SHEETS—SHEET 5.

Witnesses
Jas. L. Butler.
A. L. McClintock

Inventors
EDWARD NALL.
AND
WILLIAM G. TYLER.

By C. E. Humphrey

Attorney

UNITED STATES PATENT OFFICE.

EDWARD NALL AND WILLIAM C. TYLER, OF AKRON, OHIO, ASSIGNORS TO THE GOOD-YEAR TIRE AND RUBBER COMPANY, OF AKRON, OHIO, A CORPORATION OF OHIO.

SKIVING-MACHINE.

1,116,101.  Specification of Letters Patent.  Patented Nov. 3, 1914.

Application filed April 11, 1914. Serial No. 831,132.

*To all whom it may concern:*

Be it known that we, EDWARD NALL and WILLIAM C. TYLER, citizens of the United States, residing at Akron, in the county of Summit and State of Ohio, have invented new and useful Improvements in Skiving-Machines, of which the following is a specification.

This invention relates to machines for skiving or beveling the edges of strips of material, and is particularly adapted for cutting a plurality of longitudinal strips with skived or beveled edges from a wide continuous strip of material, from which strips the highly-resilient inner tubes of double-tube pneumatic tires are formed. Briefly, heretofore these strips have been made by hand from stock laid on a table, an operation requiring great skill in cutting the highly-resilient, tough and tacky rubber with any degree of accuracy; furthermore, the tables occupy a vast amount of space, and there is a relatively-large amount of waste due to inaccuracies of the workmen; and finally, the result of skiving by hand is not satisfactory in view of the fact that the angle or inclination of the skive or bevel does not give, under ordinary circumstances, a sufficiently wide inclined portion to make the most perfect joint.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Fig. 2, is a side elevation of the same looking from the right in Fig. 1.

Figure 1:
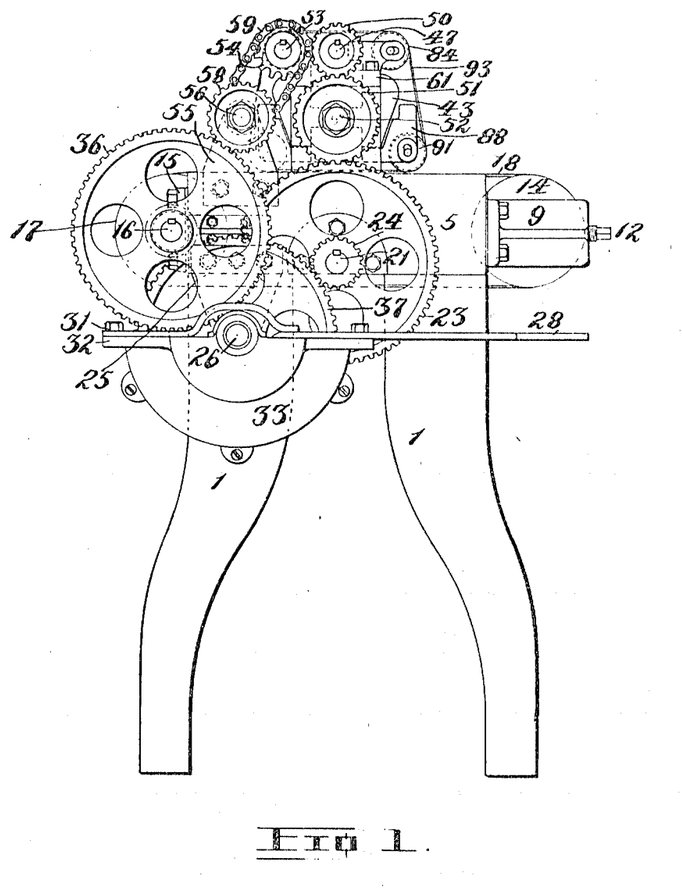
Figure 1, is a view in end elevation of a machine embodying this invention.

In the description which follows, it will be assumed that the portion of the device which is shown to the right in Fig. 1 is the front of the machine and that shown to the left is the rear of the machine, and the portion shown containing the gears is the left end of the machine and that containing the belt pulleys, the right of the machine.

The device embodies a supporting frame work comprising a pair of legs 1 and a second pair 2, and on the upper ends of these pairs of legs is mounted a table 3 and preferably hollowed out at 4 for the sake of lightness. The frame is provided with closed ends 5 and 6 and the side faces of the table 3 intermediate the ends thereof are provided with concave portions 7 for a purpose to be later described. The upper face of the table immediately adjacent to the concave portion 7 is slightly downwardly-beveled at 8. Secured to the front face of the table 3 are a pair of horizontal brackets 9 provided on their opposing faces with dove-tailed ways 10 to slidably hold bearings 11 having dove-tailed projections engaging in the dove-tailed ways 10. The position of the bearings 11 with respect to the table 3 is controlled through the medium of adjusting screws 12. These brackets and bearings are positioned on opposite sides of and near to the ends of the concave portion 7 on the front of the table 3 and mounted in the bearings 11 is a shaft 13 of an idler roll 14. Secured on the rear face of the table 3 are a pair of bearings 15 one only of which is shown in Fig. 1, and these are likewise positioned diametrically opposite to the bearings 11 and on opposite sides of the concave portion 7 of the rear side of the member 3. Mounted in the bearings 15 is a shaft 16 keyed to which is a roll 17 preferably similar in all respects to the roll 14. It will be noted that by providing the concave portions 7 the rolls are permitted to be placed nearer together and therefore occupy less space while being equally efficient. The rolls 14 and 17 are adapted to receive a heavy belt 18 which passes around both rollers and over the upper face of the table 3 and downwardly between the pairs of legs 1 and 2 and below the lower face of the table 3. The adjusting screws 12 constitute means for shifting the position of the roller 14 and to cause the latter when shifted away from the table 3 to tighten the belt 18 to keep the same at all times under tension.

Figure 4:
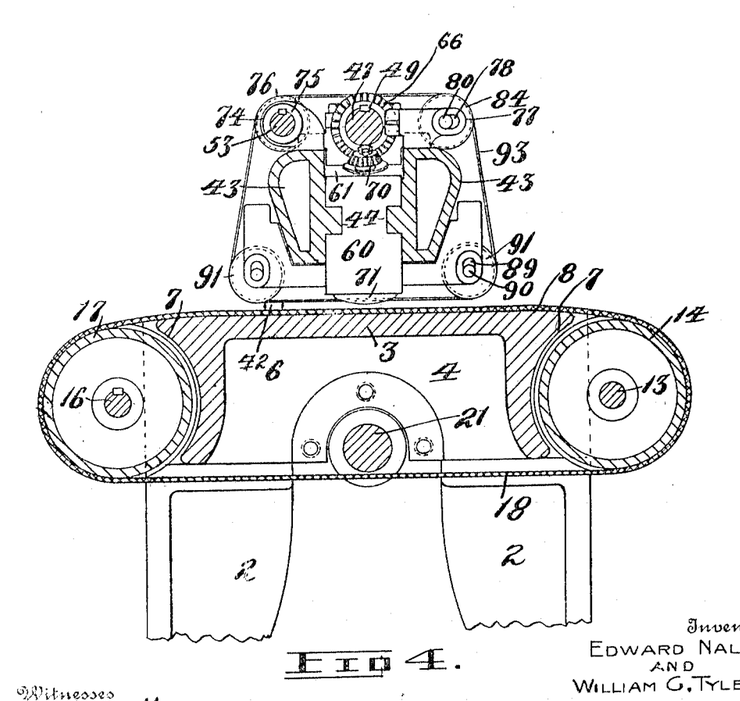
Fig. 4, is a transverse sectional view of a portion of the upper part of the machine.
Figure 5:
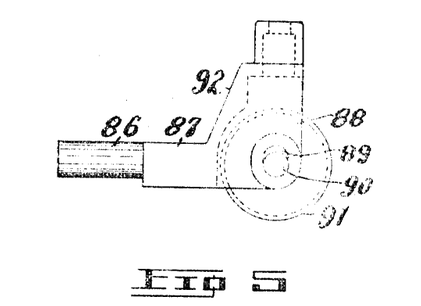
Figs. 5 and 6, are respectively, side and plan views of different rollers employed, together with their supporting instrumentalities.
Figure 6:
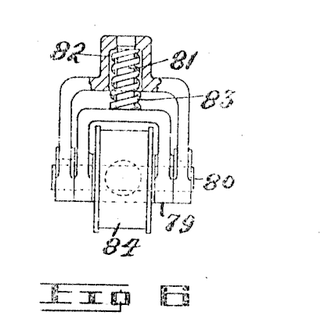
Figure 7:
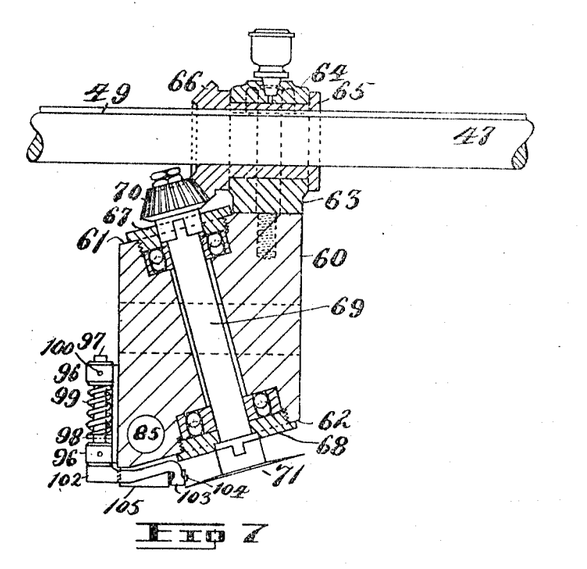
Fig. 7, is a vertical central sectional view of the skiving tool and its supporting mechanism.
Figure 8:
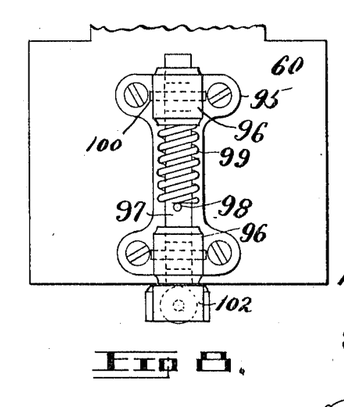
Figs. 8 and 9, are front and side elevations of a tension device for one of the belts; and, Fig. 10, is an end elevation of a portion of the upper part of the device, to illustrate how the carriage frame is supported to permit it to be raised from the work.
Figure 9:
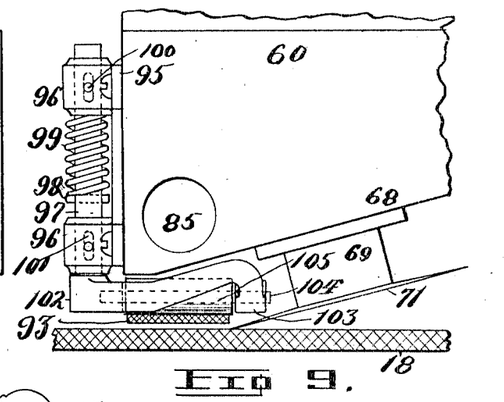
Figure 10:
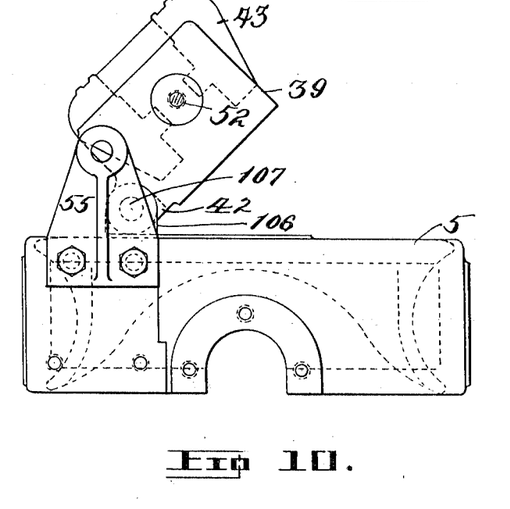

Mounted on the end 6 of the table 3 is a bearing 19 and on the end 5 of the table is a bearing 20. The lower central portions of the ends of the members 5 and 6 are cut away as shown in Figs. 4 and 10 to receive these bearings. Mounted in these bearings is a driving shaft 21 on the right end of which are tight and loose belt-pulleys 22 by which motion is communicated to the shaft. On the opposite end of the shaft and outside of the bearing 20 is a large spur-gear 23. To the left of the spur-gear 23 and keyed to the shaft 21 is a pinion-gear 24. Mounted on the left face of the end-forming member 5 of the table 3 is a bracket 25 bearing a journal-bearing in which is mounted a shaft 26. Splined on the shaft 26 is the shiftable member 27 of a square-jawed clutch (see Fig. 2) and which is shifted longitudinally of the shaft 26 through the medium of a clutching lever 28 provided with a yoke portion 29 to receive the nogs 30 of the shifting ring of the clutch member 27. The end of the lever is fulcrumed on a bolt 31 on a bracket 32 attached to an inclosing hood 33 secured to the end 5 of the member 3. Loosely mounted on the shaft 26 is a pinion-gear 34 the hub of which constitutes a complementary clutch member which is adapted to interengage with the clutching member 27 when the latter is shifted. Mounted on the shaft 16 is a large spur-gear 36 which is adapted to intermesh with the pinion 34 and be revolved by it whenever clutching engagement is established between the members 27 and 35. Fixedly mounted on the shaft 26 is a large spur-gear 37 which is adapted to intermesh with the pinion-gear 24. It will be noted from the gearing described that the speed of rotation of the shaft 16 will be relatively very slow with respect to the speed of rotation of the driving shaft 21.

Mounted on the upper face of the table 3 is a frame denominated generally by the reference numeral 38 and consisting of ends or heads 39 and 40 the lower portions of which are adapted to seat on the upper faces of the table 3 and near to the ends thereof. The upper portions of these heads 39 and 40 are provided with seats 41 for a purpose to be later described. The heads 39 and 40 are provided on their rear faces, the left in Fig. 1, with projecting apertured lugs 42 for a purpose to be later described. Extending between the heads 39 and 40 and longitudinally of the table 3 are a pair of integral bars 43 arranged in parallelism and with their opposing faces vertical and provided with inwardly-projecting oppositely-arranged ribs 44. These bars, best shown in Fig. 4, constitute supporting and guiding means for the carriages which are adapted to carry the skiving tools. Mounted on the seats 41 on the heads 39 and 40, are a pair of journal bearings 45 and 46 in which is mounted a rotatable shaft 47 held against longitudinal movement by the collars 48 and this shaft is provided with a longitudinally-extending key 49. The shaft at the left of the bearing 45 is provided with a spur-gear 50 which is adapted to intermesh with a spur-gear 51 mounted on a stub-shaft 52 on a lug on the head 39. The spur-gear 51 intermeshes with the spur-gear 23 so that as the latter revolve in unison with the driving shaft the shaft 47 is rotated at great speed through the described gearing. Also mounted on the seats 41 of the heads 39 and 40 are journal-bearings for a shaft 53 parallel with the shaft 47 and provided with a longitudinally-extending key for a purpose to be later described. The shaft 53 bears at its left end a sprocket wheel 54. Mounted on a bracket 55 which is secured to the end 5 of the table 3 is a stub-shaft 56 on which is mounted a sprocket wheel 57 and also a spur-gear pinion 58 which is adapted to intermesh with the gear 36 so that when the latter is rotated, motion is communicated from said gear 36 to the pinion 58 and from thence to the sprocket wheel 57 and from thence to the gear 54 by means of a sprocket-chain 59, to thereby cause rapid rotation of the shaft 53. On the upper face of the table rearwardly of the heads 39 and 40 are aperture lugs, 106 and they are so placed as to lap the sides of the lugs 42 on the heads 39 and 40 and pins 107 are passed through the alined apertures so as to pivotally connect them, the pins constituting pivots for permitting the entire frame, denominated as 38, to be swung rearwardly so as to give access to the upper face of the belt 18 when desired.

The skiving tools are carried by a plurality of carriages, that is to say, each carriage carries a single skiving tool and these carriages are adjusted longitudinally of the device so as to enable them to cut strips of material of different widths and as all of the carriages and skiving tools are similar a description of one is believed to be sufficient.

Figure 3:
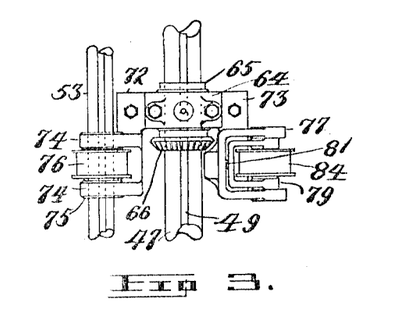
Fig. 3, is a plan view of a portion of a carriage for carrying a skiving tool.

The skiving-tool carriage consists of a body portion 60 which is positioned between the longitudinal bars 43 and is provided in the lateral faces thereof with grooves to receive the ribs 44 which constitute slides for shifting the carriage. Portions of the upper face 61 and lower face 62 of the body portion 60 of the carriage are inclined and are in parallelism for a purpose to be later described. Secured to the upper horizontal face of the body portion 60 of the carriage is a lower member 63 of a journal box which is provided with a cap 64 (see Fig. 3) and in the box is mounted a hub 65 which is provided with a groove to receive the key 49 on the shaft 47, so that the hub 65 revolves in unison with the shaft. The end of the hub 65 bears a beveled gear 66. Mounted in suitable bearings 67 and 68 in the upper and lower faces 61 and 62 of the body portion 60 of the carriage, is a shaft 69 inclined at an angle with respect to the vertical axis of the device and provided at its upper end with a bevel-gear 70 intermeshing with the bevel-gear 66. The lower end of the shaft 69 is provided with a skiving tool 71 which consists of a thin sheet of metal in circular form and with the periphery thereof constituting a cutting edge for the skiving operation.

It will be seen that the rotation of the driving shaft will cause an extremely rapid rotation of the shaft 47 and a greater speed of rotation of the skiving tool 71 so that the skiving or beveling operation of a piece of material fed over the belt 18 is easily accomplished.

In order to hold the material to be acted upon, the following mechanism is employed, reference being directed to Figs. 3, 4, 5 and 6: Secured to the body portion 60 of the carriage are a pair of projecting brackets 72 and 73 oppositely disposed to each other and in alinement. The bracket 72 is provided with a pair of ears 74 having alined apertures in which is mounted a sleeve 75 provided with a groove to receive the key shaft 53 and fixedly mounted on the sleeve 75 is a flanged pulley 76 so that as the shaft 53 is revolved by the mechanism already described, the pulley 76 will be revolved. The bracket 73 is provided with a pair of horizontal arms 77 in which are alined slots 78 constituting bearings. Adapted to be mounted between the arms 77 is a yoke (see Fig. 6) consisting of a pair of bifurcated arms 79 provided with apertures to receive a shaft 80 which also extends through the slots 78 in the arms 77. The rear portion of the yoke is provided with a stem 81 which is freely received in a socket 82 the bracket 73 and the yoke 79 being constantly forced outwardly through the medium of a resilient element 83 for a purpose to be later described. Mounted on the shaft 80 is a flanged-pulley 84.

The opposite sides of the lower portion of the body member 60 of the carriage are provided with oppositely-disposed openings 85 which are positioned below the centers of the pulleys 76 and 84 and in these two openings are inserted the stem ends 86 of housings 87 generally right-angular in formation and bearing in the side walls 88 thereof a pair of slotted openings 89 constituting bearings for the pivots 90 of flanged pulleys 91. Within the housing are mounted yokes identically similar to those shown in Fig. 6 and designated by the numerals 79, being held resiliently in position in the same manner except that the springs force the rolls 91 downwardly instead of laterally, as is the case with respect to the rolls 84. The main portions of the housings 87 are provided on their inner faces with inclined walls 92 which are adapted to seat against the outer lateral faces of the two bars 43. A belt 93 is passed around the pulleys 76, 84 and 91 of each carriage and motion is communicated to the belt through the medium of the shaft 53 rotating the sleeve 75. The two rollers 91 will be positioned in transverse horizontal alinement and slightly above the upper face of the main belt 18 and the material to be acted upon by the skiving tools 71 will pass forwardly in unison with the belt 18 and be held in frictional engagement therewith through the medium of the belts 93.

Experience has demonstrated that the side thrusts of the skiving knife 71 has a tendency to distort the material acted upon, and hence, in order to hold it against lateral movement, I employ a pressure roll mounted as follows: Secured to the left lower face of the body portion 60 of each carriage is a bracket 95 provided with a pair of bearings 96 in which is vertically shiftably mounted a shaft 97 which carries a cross-pin 98 above which is a coiled spring 99 the normal tendency of which is to force the shaft downwardly. In order to prevent the shaft 97 from rotating it is provided with one or more cross-pins 100 which run in suitable slots 101 in the bearings 96. Secured to the lower end of the shaft 97 is a horizontal arm 102 the median portion of which is upwardly-inclined terminating in a downwardly-turned end 103. The median portion is bifurcated with the sides separated from one another and united with the portions 102 and 103. Mounted in the bifurcated portion of the member 102 on a shaft 104 is a pressure roller 105 normally adapted to be forced downwardly against the upper face of the belt 93 through the medium of the spring 99. It will be noted that the roller 105 forces the belt 93 downwardly at a point exactly opposite to the center of the skiving knife 71.

In operation, the clutch lever is shifted to disengage the clutching members 27 and 35 to prevent revolution of the gear 36. Motion is communicated in the usual way by a belt applied to the driving pulley 22. This causes rapid revolution of the skiving knives 71, as has already been described. The carriages which carry the skiving knife are spaced apart a desired distance to provide strips having skived edges of the required width, and while only two of the carriages and skiving knives are shown in Fig. 2, their number may be increased as desired, and if it is desired to discontinue the operation of any of them they are shifted to the right in Fig. 2 until the hubs 65 of the bevel gears 66 have passed beyond the key 49. The skiving knives are so geared that they run with the cut so that their working edges revolve in the same direction as the belts 18 and 93, which is from the right to the left in Fig. 1. After the knives have been started, the clutch members are thrown into clutching engagement which causes the belts 18 and 93 to move in unison in the same direction and approximately at the same speed. A wide strip of prepared material is then fed over the belt 18 and under the several belts 93 and during the passage of the material over the belt 18 the skiving knives divide the broad strip of material into a plurality of narrow strips with the edges thereof skived at a desired inclination which inclination is controlled by the inclination given to the skiving knives 71.

Experience has demonstrated clearly that the device operates with great accuracy and great speed and effects a saving in time and labor besides insuring more accuracy in the operation of skiving, and produces a skived edge of greater width than is possible when the same operation is done by hand.

We claim:

1. A skiving machine embodying a pair of belts engaging opposite sides of the material to be skived and moving in the same direction at the same speed, and skiving tools for making oblique cuts in the material, said cuts extending in the same direction as the belts and also in parallelism with one another.

2. A skiving machine comprising a lower belt constituting a supporting platform, a belt positioned above said first belt with portions thereof in approximate parallelism therewith, said belts being spaced apart sufficiently to permit the passage of the material between them, means for moving the working portions of said belts in the same direction, and skiving tools for making oblique cuts in the material, said cuts extending in the same direction as the belts and also in parallelism with one another.

3. A skiving machine comprising a supporting table, a driving and an idler roll mounted on opposite sides thereof, a belt on said rolls arranged to move over the upper face of said table, a second belt mounted above said first belt and with the working portion thereof adapted to pass in close proximity to said first belt to thereby provide a space for the passage of the material to be skived, and a pair of skiving tools mounted for adjustment longitudinally of said machine and adapted to divide the material into a series of strips having parallel oblique edges.

4. A skiving machine comprising a supporting table, a driving and an idler roll on opposite sides thereof, a belt around said rolls arranged to pass over the upper surface of said table, a shiftable carriage above said table, a belt on said carriage adapted to have its working portion move in unison with and in the same direction as said first belt, said belts being spaced apart sufficiently to permit the passage of material between them, and rotary skiving-tools arranged to make parallel oblique cuts through said material in such manner as to divide the material into a series of strips having parallel oblique edges.

5. A skiving machine embodying a supporting table, a driving roll on one side of said table, an idler roll on the opposite side thereof, means for rotating said driving roll, a belt around said rolls the working portion of which extends over the top of said table, a carriage mounted above said table, a plurality of rolls on said carriage, a belt extending around said rolls, a portion of said rolls being positioned to cause said belt to pass in close proximity to the upper surface of said first belt, means for moving said belt, said means being adapted to cause the portion of the belt adjacent the lower belt to move in unison therewith, a rotatable shaft supported by said carriage, and an inclined skiving tool rotated by said shaft, said skiving tool being arranged to make parallel oblique cuts through said material in such manner as to divide the material into a series of strips having parallel oblique edges.

6. A skiving machine embodying a supporting table, a driving roll on one side of said table, an idler roll on the opposite side thereof, means for rotating said driving roll, means to interrupt the rotation of said driving roll, a belt around said rolls the working portion of which extends over the top of said table, a carriage mounted above said table, a plurality of rolls on said carriage, a belt extending around said rolls, a portion of said rolls being positioned to cause said belt to pass in close proximity to the upper surface of said first belt, means for moving said belt, said means being adapted to cause the portion of the belt adjacent the lower belt to move in unison therewith, and a skiving tool adapted to engage a strip of material supported by said lower belt at a point near to where said material is engaged by said upper belt.

7. A skiving machine embodying a supporting table, a driving roll on one side of said table, an idler roll on the opposite side thereof, means for rotating said driving roll, a belt around said rolls the working portion of which extends over the top of said table, a carriage shiftable longitudinally of said table, a plurality of rolls on said carriage, a belt extending around said rolls, a portion of said rolls being positioned to cause said belt to pass in close proximity to the upper surface of said first belt, means for moving said belt, said means being adapted to cause the portion of the belt adjacent the lower belt to move in unison therewith, and a skiving tool adapted to engage a strip of material supported by said lower belt at a point near to where said material is engaged by said upper belt.

8. A skiving machine comprising a supporting table, rollers mounted on opposite sides of said table, a belt passing around said rollers and over the top of said table, a shaft on which one of said rollers is mounted, a gear on said shaft, a driving shaft supported by said table, mechanism for transmitting motion from said driving shaft to said gear for moving said belt, a carriage positioned above said table and shiftable longitudinally thereof, a plurality of rolls carried by said carriage two of which are positioned with their peripheries near to the upper face of said belt, a belt on said rolls, said belt being adapted when moved to pass in close proximity to said first belt leaving, however, a space through which material to be skived may pass, a skiving tool carried by said carriage and arranged to engage material near where it is engaged by said belts, a shaft extending above said table, means carried by said carriage engaging said shaft for transmitting motion from said shaft to said skiving tool, and means for transmitting motion from said driving shaft to said last-mentioned shaft.

9. A skiving machine comprising a table, a pair of rolls mounted on opposite sides thereof, a belt passing around said rolls and over the top of said table to constitute a supporting platform for the material, a driving shaft supported by said table, means for transmitting motion from said driving shaft to one of said rolls for moving said belt, a frame mounted on said table comprising a pair of spaced parallel bars extending across the median portion of said table and over said belt, said bars constituting slides, a carriage supported by said slides, a pair of rotatable shafts mounted on said frame, means for transmitting motion from said driving shaft to said shafts, a plurality of rollers on said carriage two of which are positioned thereon near said belt, a belt running on said rolls with a portion thereof adapted to pass close to said first belt, said portion being adapted to move in unison with said first belt, means to transmit motion from one of said shafts to said belt, a skiving tool adapted to engage the material at a point near where said material is engaged by said belts, and means to transmit motion from the other shaft in said frame to said skiving tool.

10. A skiving machine comprising a supporting table, a belt adapted to move progressively over the upper surface thereof to constitute a movable material-supporting platform, a frame mounted on said table and extending over said platform, a portion of said frame constituting slides, a carriage mounted on said slides, a pair of shafts mounted on said frame above said carriage, a skiving tool carried by said carriage, means connecting said skiving tool with one shaft for rotating it, a plurality of rollers on said carriage, a belt on said rollers a portion of which is adapted to engage the material on said platform, one of said rollers being splined on the other shaft, a driving shaft supported by said table, and means to communicate motion from said driving shaft to said first-mentioned shafts, and means for communicating motion from said driving shaft to said first mentioned belt for moving it.

11. A skiving machine comprising a supporting table, a belt adapted to move progressively over the upper surface thereof to constitute a movable material-supporting platform, a frame mounted on said table above said platform a portion of which constitutes slides, a carriage mounted on said slides, a shaft supported by said carriage and carrying a skiving tool adapted to engage the material on said platform, a bevel-gear on the shaft of said skiving tool, a pair of shafts mounted on said frame above said carriage, a bevel gear splined on one of said shafts and adapted to engage the bevel-gear on said tool-shaft for transmitting motion from the shaft to the tool irrespective of the longitudinal position of said carriage, a plurality of rollers on said carriage, one of which is splined on the other shaft, a belt running on said rollers a portion of which is adapted to engage the upper face of material on said platform near the working edge of said skiving tool, a driving shaft, and means to transmit motion therefrom to the shafts on said frame and to said first mentioned belt for actuating them all simultaneously.

12. A skiving machine comprising a supporting table, a belt adapted to move progressively over the upper surface thereof to constitute a movable material-supporting platform, a frame mounted on said table above said platform a portion of which constitutes slides, a carriage mounted on said slides, a skiving tool on said carriage adapted to engage the material on said platform and having a shaft, a bevel-gear on the shaft of said skiving tool, a pair of shafts mounted on said frame above said carriage, a bevel-gear splined on one of said shafts and adapted to engage the bevel-gear on said tool-shaft for transmitting motion from the shaft to the tool irrespective of the longitudinal position of said carriage, a plurality of rollers, one of said rollers being outwardly spring-pressed to constitute a belt-tightener, a belt running on said rollers a portion of which is adapted to engage the upper face of material on said platform near the working edge of said skiving tool, a driving shaft, and means to transmit motion therefrom to the shafts on said frame and to said first mentioned belt for actuating them all simultaneously.

13. A skiving machine comprising a supporting table, a belt adapted to move progressively over the upper surface thereof to constitute a movable material-supporting platform, a frame hinged to said table to permit it to be swung away from said belt, a portion of said frame constituting slides, a carriage mounted on said slides, a skiving tool mounted on said carriage for engaging the material on said platform, a plurality of rollers on said carriage, a belt running on said rollers a portion of which engages the upper surface of the material on said platform, a pair of shafts on said frame one of which has connection with said skiving tool and the other being in operative connection with one of the rollers which bears the second belt for moving it, a driving shaft and means to transmit motion from said driving shaft to said first mentioned belt for moving it.

14. A skiving machine comprising a supporting table, a belt adapted to move progressively over the upper surface thereof to constitute a movable material-supporting platform, a frame mounted above said belt and pivoted to said table to permit it to be swung to expose the material on said belt, a carriage on said frame, a skiving tool on said carriage, a belt mounted on said carriage for engaging the upper surface of said material near the working edge of said skiving tool and means for communicating motion to said belts and skiving tool.

15. A skiving machine comprising a supporting table, a belt adapted to move progressively over the upper surface thereof to constitute a movable material-supporting platform, a frame mounted above said belt and pivoted to said table to permit it to be swung to expose the material on said belt, a carriage on said frame, a skiving tool on said carriage, a belt mounted on said carriage for engaging the upper surface of said material near the working edge of said skiving tool, a pressure roller adapted to force a portion of the belt carried by said carriage against the material at a point near to where said material is engaged by said skiving tool, and means for communicating motion to said belts and skiving tool.

In testimony whereof we have hereunto set our hands in presence of two subscribing witnesses.

EDWARD NALL.
WILLIAM C. TYLER

Witnesses:
ROSE M. LE MIEUX,
ANNA J. GILHOOLY.